United States Patent
Weiss

(10) Patent No.: US 7,090,192 B2
(45) Date of Patent: Aug. 15, 2006

(54) VACUUM VALVE

(75) Inventor: Wolfgang Weiss, Hard (AT)

(73) Assignee: VAY Holding AG, Haag (CH)

( * ) Notice: Subject to any disclaimer, the term of this patent is extended or adjusted under 35 U.S.C. 154(b) by 352 days.

(21) Appl. No.: 10/690,091

(22) Filed: Oct. 21, 2003

(65) Prior Publication Data

US 2005/0109968 A1    May 26, 2005

(51) Int. Cl.
*F16K 1/16* (2006.01)
(52) U.S. Cl. .................. 251/301; 251/298; 137/613
(58) Field of Classification Search ............... 251/205, 251/298, 301; 137/613
See application file for complete search history.

(56) References Cited

U.S. PATENT DOCUMENTS

| | | | |
|---|---|---|---|
| 1,609,894 A | * | 12/1926 | Trent .......................... 138/45 |
| 4,052,036 A | | 10/1977 | Schertler |
| 4,470,576 A | | 9/1984 | Schertler |
| 4,560,141 A | * | 12/1985 | Bosch ....................... 251/167 |
| 5,577,707 A | | 11/1996 | Brida |
| 6,431,518 B1 | | 8/2002 | Geiser |

FOREIGN PATENT DOCUMENTS

GB            2 205 926        12/1998

\* cited by examiner

*Primary Examiner*—Edward K. Look
*Assistant Examiner*—John K. Fristoe, Jr.
(74) *Attorney, Agent, or Firm*—Reed Smith LLP

(57) ABSTRACT

A vacuum valve comprising a valve body with a valve opening, a valve plate which is movable between an open position in which it lies next to the valve opening and releases the valve opening and a closed position in which the valve opening is covered and a diaphragm plate which is movable between a passive position, in which it lies next to the valve opening and releases the valve opening, and an active position in which it partially covers the valve opening. The vacuum valve has a completely open state in which the valve plate is in its open position and the diaphragm plate is in its passive position, a completely closed state in which the valve plate is in its closed position and is sealed relative to the valve body, and a partially closed state in which the valve plate is in its open position and the diaphragm plate is in its active position, wherein the vacuum valve has a reduced cross section compared to the completely open state.

17 Claims, 15 Drawing Sheets

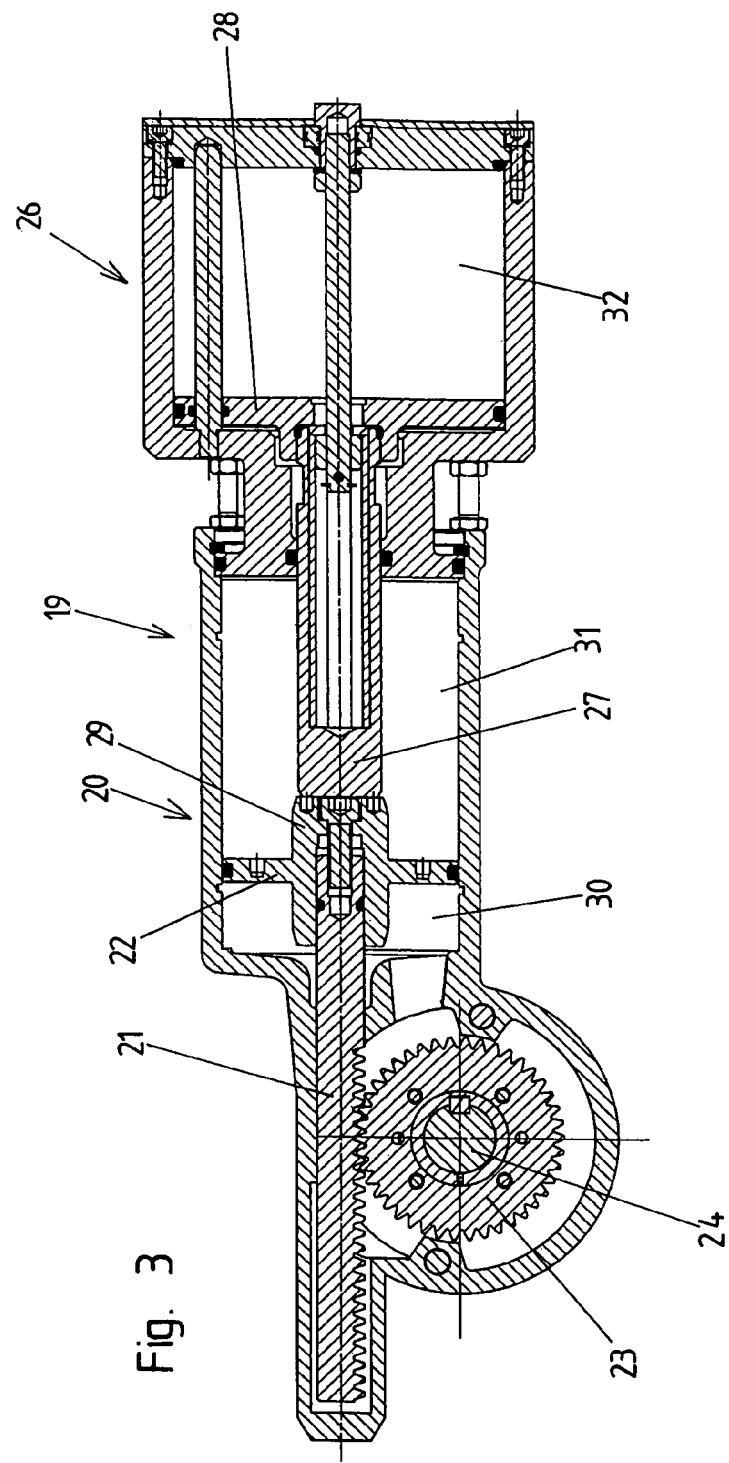
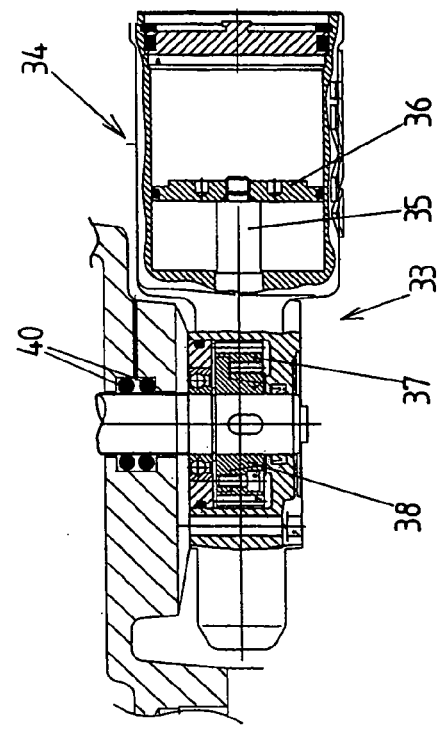
Fig. 3
Fig. 4

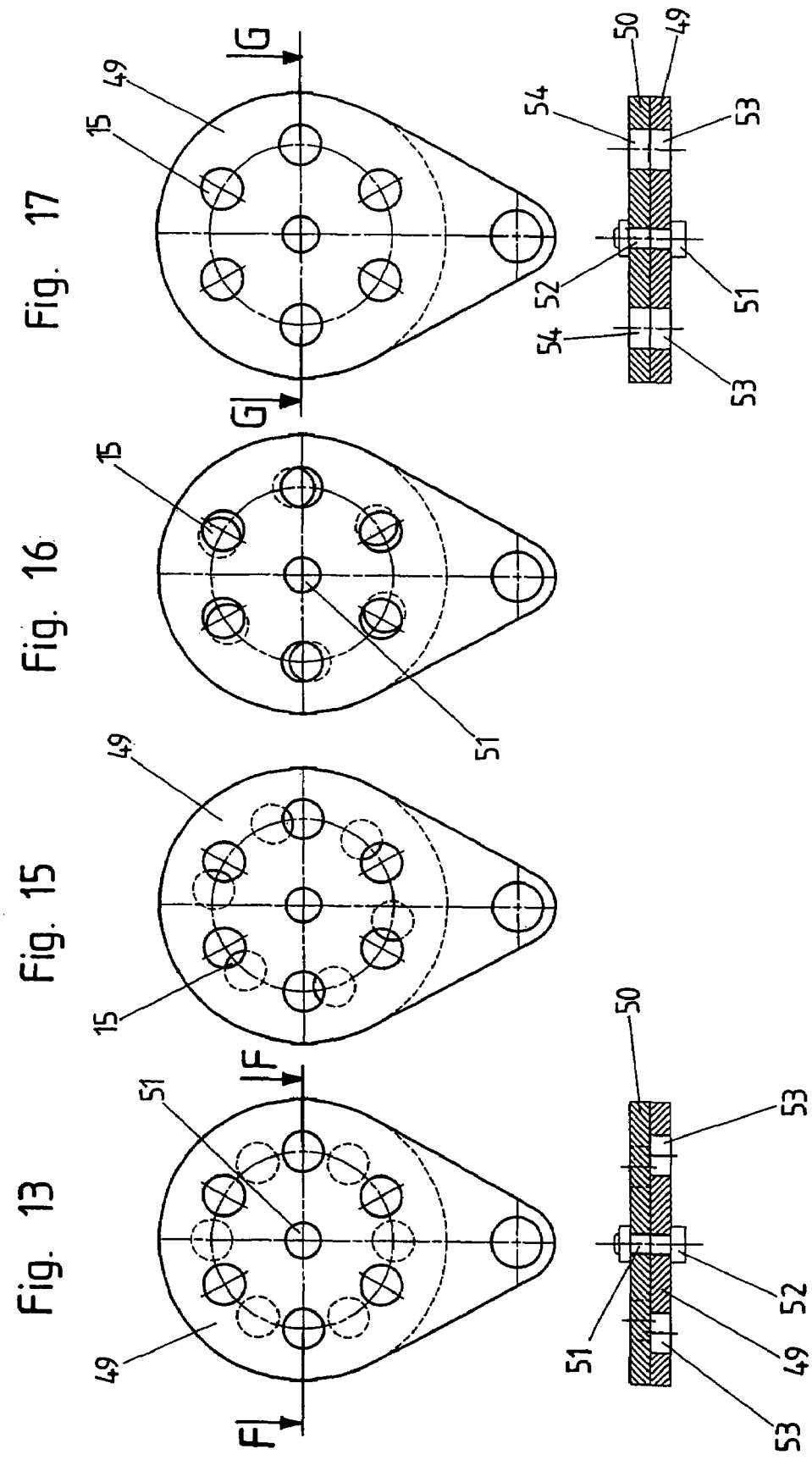

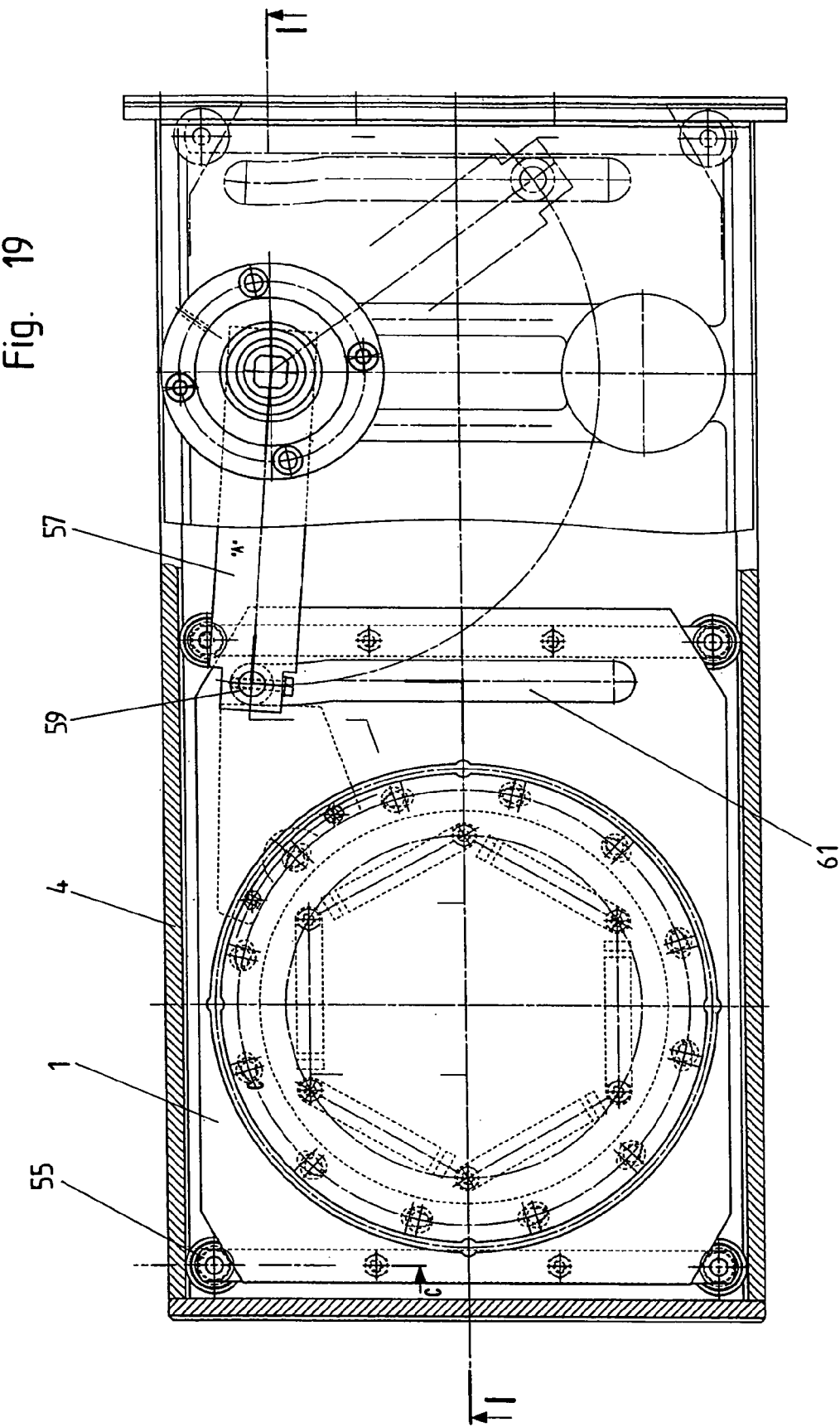

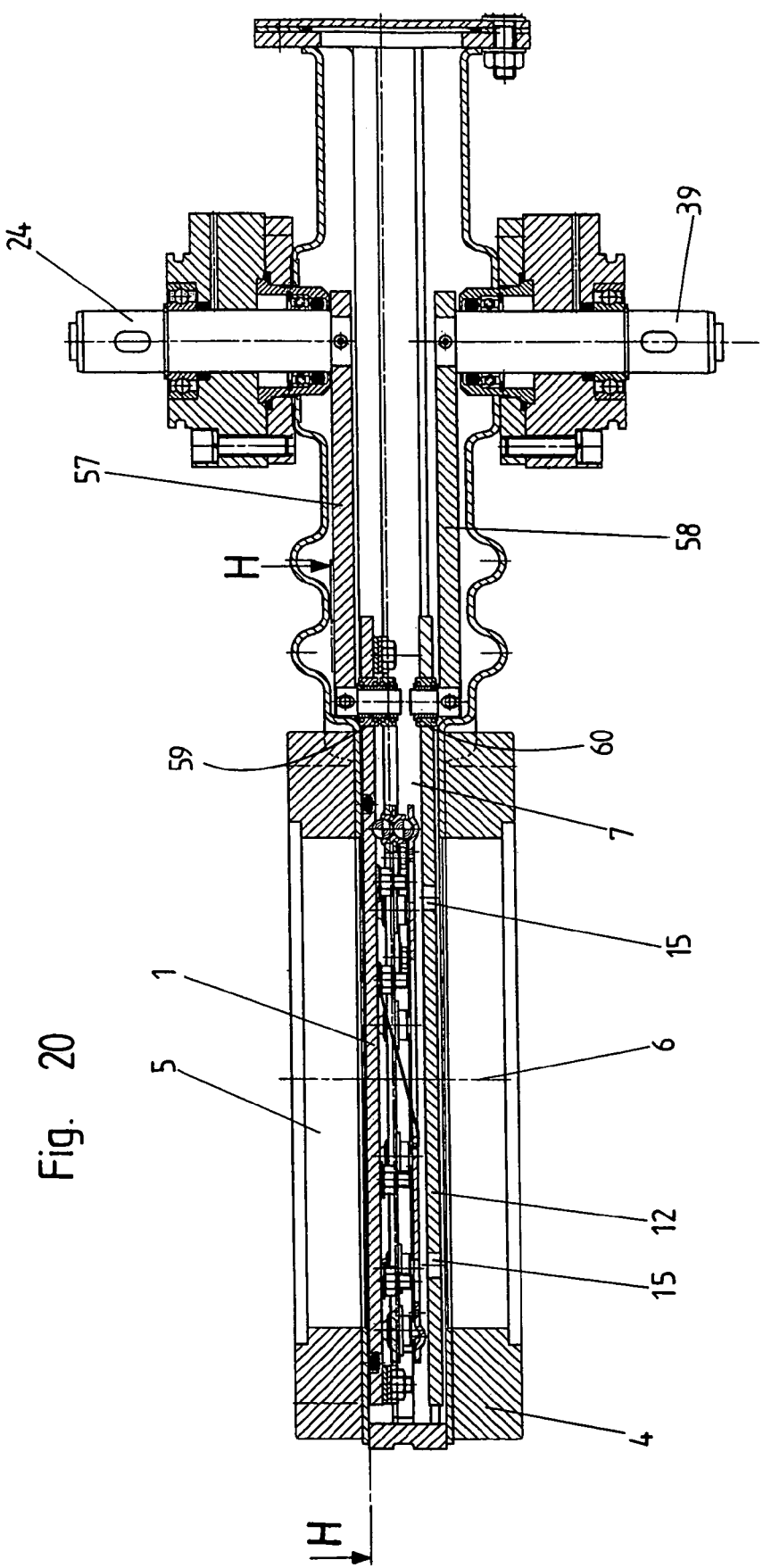

VACUUM VALVE

BACKGROUND OF THE INVENTION a) Field of the Invention

The invention is directed to a vacuum valve comprising a valve body with a valve opening, a valve plate which is movable between an open position in which it lies next to the valve opening and releases the valve opening and a closed position in which the valve opening is covered, wherein the vacuum valve has a completely open state in which the valve plate is in its open position and a completely closed state in which the valve plate is in its closed position and is sealed relative to the valve body.

b) Description of the Related Art

There are different known embodiment forms of valves in which the valve plate is laterally adjacent to the valve opening in the open state and is displaceable into a position in which the valve opening is covered for closing the valve. Valves of this type are known as slide valves.

In a conventional embodiment form of valves of the type mentioned above, the valve plate is initially displaced from its open position into a position in which the valve opening is completely covered but the valve plate is raised from the valve seats arranged at the valve body. This displacement is carried out in the plane of the valve plate. The valve plate is subsequently set against the valve seat so that sealing is achieved relative to the valve body.

Slide valves of the type mentioned above are known, for example, from U.S. Pat. No. 4,052,036, U.S. Pat. No. 4,470,576, and U.S. Pat. No. 4,660,141. After the valve plate has achieved the state in which the valve opening is completely covered when closing the valve, the valve plate is spread apart for advancing the valve plate toward the valve body and for sealing relative to the latter. The contents of these patents are hereby adopted through reference.

Aside from valves in which the valve plate is displaceable in a straight line between its open position and its position in which the valve opening is covered, there are also known valves of this type in which the valve plate is swiveled around a swiveling axis extending perpendicular to the plane of the valve plate. Valves of this type are also known as pendulum slides or pendulum valves. In one embodiment form of a valve of this kind, the valve plate is spread apart in a manner analogous to valves that are displaceable in a straight line.

Further, there are known vacuum valves of the kind mentioned above in which L-shaped movements of the valve plate are carried out when closing the valve. In this connection, a displacement of the valve plate is initially carried out again in its plane (between the open position and the position in which the valve opening is completely covered) and, after reaching the position in which the valve opening is covered, a displacement is carried out vertical thereto. A valve of this type is known from U.S. Pat. No. 6,431,518B1, for example. Apart from valves with valve plates which are displaceable in a straight line proceeding from their open position, there are other valves in which the valve plate is swiveled around a swiveling axis extending perpendicular to its plane. In addition to L-movements, grinding movements (with movement components diagonal to the plane of the valve plate, particularly shortly before closure of the valve), also referred to as J-movements, are known.

Further, there are known slide valves in which the displacement of the valve plate and sealing of the valve are carried out only by a straight-line movement (in the principal plane of the valve plate), wherein the sealing surface and the sealing ring have a three-dimensional orientation or alignment. A design of this type is described, for example, in the British Patent Application GB 2 205 926 A whose contents are hereby likewise adopted through reference.

U.S. Pat. No. 5,577,707 discloses a slide valve in which an annular seal connection piece is provided for sealing the valve plate relative to the valve body in the completely closed state of the valve. The seal connection piece is mounted in the through-channel of the valve body forming the valve opening so as to be displaceable vertical to the plane of the valve plate and is accordingly sealed relative to the valve body. In the completely closed and sealed state of the valve, the seal connection piece is advanced toward the valve plate and is likewise sealed relative to it. The contents of this patent are hereby adopted through reference.

In slide valves which are constructed as regulating valves, the valve plate can be moved into various intermediate positions between its initial position and its end position by means of the correspondingly constructed drive of the valve plate, so that the cross section of the valve opening is adjustable in order to configure the conductivity of the valve in a controllable manner. Stepping motors, for example, can be used to drive the valve plate.

In some applications, however, the ability to fully regulate the cross section of the valve opening is not required and not even desirable. In this case, in addition to the completely open state and the sealed state of the valve, there is only a predetermined partially closed state in which the valve plate can be moved into an intermediate position determined by the drive between its open position and its closed position. Valves of this kind are also known as three-position valves and the drives used in this case, particularly pneumatic drives, are known as three-position drives. A disadvantage in these three-position valves consists in that the orifice opened in the intermediate position of the valve plate is not symmetric to the axis of the valve opening so that the gas flow through the valve is asymmetric, which is undesirable in various applications, for example, in semiconductor technology.

OBJECT AND SUMMARY OF THE INVENTION

An important object of the invention is to provide a vacuum valve which has a partially closed state with reduced cross section in addition to a completely open state and a completely closed state.

Another object of the invention is to provide a valve of the type mentioned above having an at least substantially symmetric flow in the partially closed state with respect to the axis of the valve opening, at least with respect to a plane in which the valve axis lies.

A further object of the invention is to provide a valve with a partially closed state with a reduced cross section whose flow passes at least substantially centrally through the valve opening in the partially closed state.

A further object of the invention is to provide a valve with a partially closed state with a reduced cross section in which the cross section can be preadjusted in a simple manner in the partially closed state.

A further object of the invention is to provide a vacuum valve which has at least two partially closed states in addition to a completely open state and a completely closed state.

A vacuum valve, according to the invention, comprises a valve body with a valve opening, a valve plate which is movable between an open position in which it lies next to the valve opening and releases the valve opening and a closing position in which the valve opening is covered, a diaphragm plate which is movable between a passive position, in which it lies next to the valve opening and releases the valve opening, and an active position in which it partially covers the valve opening, wherein the vacuum valve has a completely open state in which the valve plate is in its open position and the diaphragm plate is in its passive position, a completely closed state in which the valve plate is in its closed position and is sealed relative to the valve body, and a partially closed state in which the valve plate is in its open position and the diaphragm plate is in its active position, wherein the vacuum valve has a reduced cross section compared to the completely open state.

A vacuum valve according to the invention has a partially closed state with a reduced cross section in the open position of the valve plate and in the active position of the diaphragm plate. The flow through the valve can advantageously be formed at least extensively symmetric to the valve axis at least with respect to a plane in which the valve axis lies. For this purpose, the diaphragm plate can have one or more openings which are symmetric with respect to the valve axis. The valve plate is at least extensively symmetric with respect to its opening or openings at least with respect to a plane in which the valve axis lies. In a preferred embodiment example of the invention, there is also at least extensive symmetry with respect to a plane vertical to this plane.

In order to preadjust the cross section in the partially closed state, the size of at least one opening of the diaphragm plate can be adjustable. For this purpose, manual adjustability can be provided in particular.

In many applications, the symmetry of flow with respect to the axis of the valve opening may be less relevant; the flow should be carried out at least extensively centric to the valve opening in this case. This can be achieved by constructing the diaphragm plate in a corresponding manner.

Further advantages and details of the invention will be described in the following with reference to the embodiment examples shown in the accompanying drawings, further objects of the invention follow from the embodiment examples.

BRIEF DESCRIPTION OF THE DRAWINGS

FIG. 3 shows a section along line B—B of FIG. 2;

FIG. 4 shows an enlarged partial view of FIG. 2 in the area of the drive of the diaphragm plate;

FIG. 13 shows a view of an embodiment example of a diaphragm plate with adjustable opening cross sections of its openings in the state in which they are closed as far as possible;

FIG. 14 shows a section along line F—F of FIG. 13;

FIG. 15 and FIG. 16 shows different adjustments of the opening cross sections of the openings;

FIG. 17 shows the state with the largest opening cross section of the openings;

FIG. 18 shows a section along line G—G of FIG. 17;

FIG. 19 shows another embodiment example of a valve according to the invention (section along line H—H of FIG. 20);

FIG. 20 shows a section along line I—I of FIG. 19;

The Figures have different scales. Similar parts in the different embodiment examples are provided with identical reference numbers.

DESCRIPTION OF THE PREFERRED EMBODIMENT EXAMPLES

Figure 5:
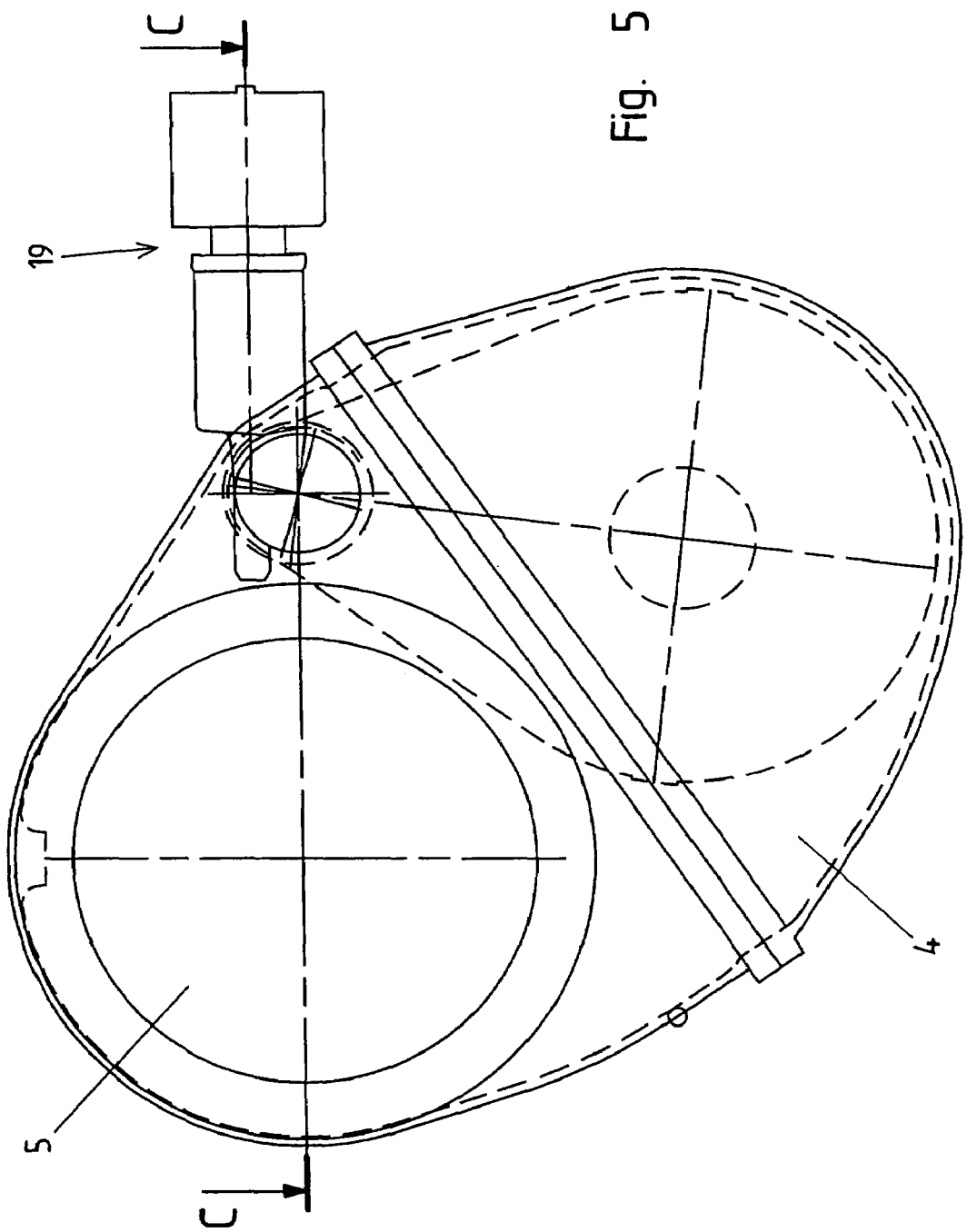
FIG. 5 shows a view corresponding to FIG. 1 in the completely open state of the valve.
Figure 6:
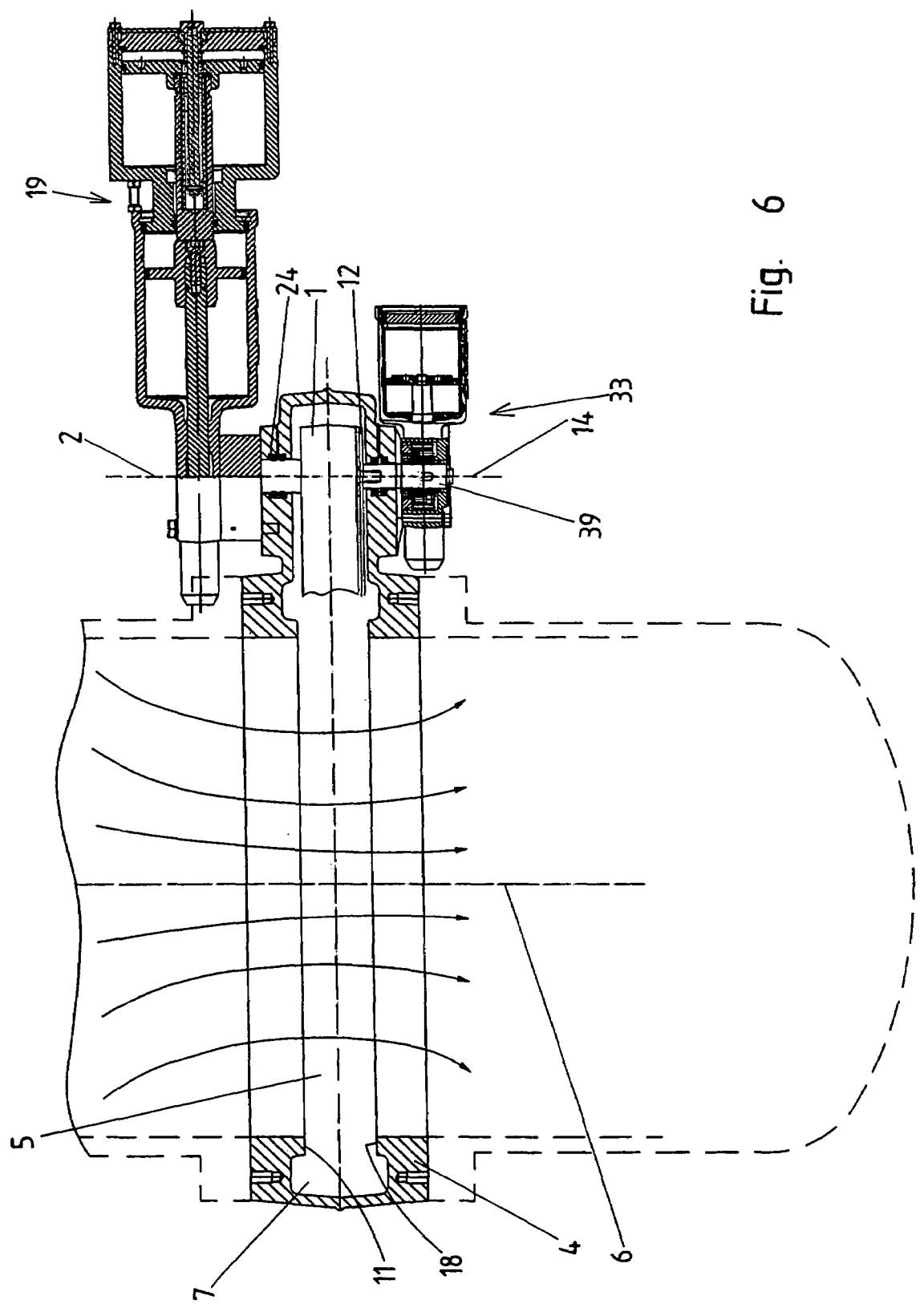
FIG. 6 shows a section along line C—C of FIG. 5.

In the embodiment example of the invention shown in FIGS. 1 to 10, the valve plate 1 is mounted so as to be swivelable relative to the valve body 4 around a swiveling axis 2 which extends perpendicular to the plane 3 of the valve plate 1. The valve body 4 has a valve opening 5 which is formed by a through-channel through the valve body 4. In a middle portion of the through-channel, a recess 7 proceeds from the latter to varying distances in all directions vertical to the axis 6 of the valve opening 5. The valve plate 1 can be swiveled into this recess 7 in the completely open state of the valve (FIG. 5 and FIG. 6). In this completely open state of the valve, the valve plate accordingly lies laterally adjacent to the valve opening 5 and completely opens the valve opening 5 (open position of the valve plate 1).

In the completely closed and sealed state of the valve (FIG. 1 and FIG. 2), the valve plate 1 is moved into a closed position in which the valve opening 5 is covered and is sealed relative to the valve body 4. In the present embodiment example, the valve plate 1 extends into the recess 7 along its entire circumference in its closed position and a sealing ring 10 which is arranged on one of the two side surfaces 8, 9 of the valve plate 1 which face in the direction of axis 6 contacts a sealing surface of the valve seat 11 arranged at the valve body 4.

Further, the valve has a diaphragm plate 12 which is likewise swivelable around a swiveling axis 14 extending perpendicular to its plane 13. In the present embodiment example, the swiveling axes 2 and 14 coincide.

The diaphragm plate is moved into a passive position in the completely open state of the valve (FIG. 5 and FIG. 6) in which it lies laterally adjacent to the valve opening 5 and completely opens the valve opening 5. In this passive position, the diaphragm plate is arranged entirely in the recess 7 of the valve body 4 in the present embodiment example.

The diaphragm plate 12 can be moved into an active position (FIGS. 1 and 2 and FIGS. 7 and 8) in which it partially covers the valve opening 5, i.e., considered in the direction of the axis 6 of the valve opening 5 a portion of the valve opening 5 remains uncovered and open in the active position of the diaphragm plate 12. For this purpose, the diaphragm plate 12 in the present embodiment example has an individual opening 15 which is defined circularly and is symmetric to the axis 6 of the valve opening 5 in the active position of the diaphragm plate 12. In its active position, the diaphragm plate 12 extends with its front edge 16 along its entire circumference beyond the cross-sectional area considered in the direction of the axis 6 of the valve opening 5, i.e., it overlaps with the valve body 4. The diaphragm plate 12 extends along its entire circumference into the recess 7 of the through-channel.

In the completely open state of the valve corresponding to FIGS. 5 and 6, as was already mentioned, the valve plate 1 and the diaphragm plate 12 lie laterally adjacent to the valve opening 5 and release the valve opening 5.

Figure 1:
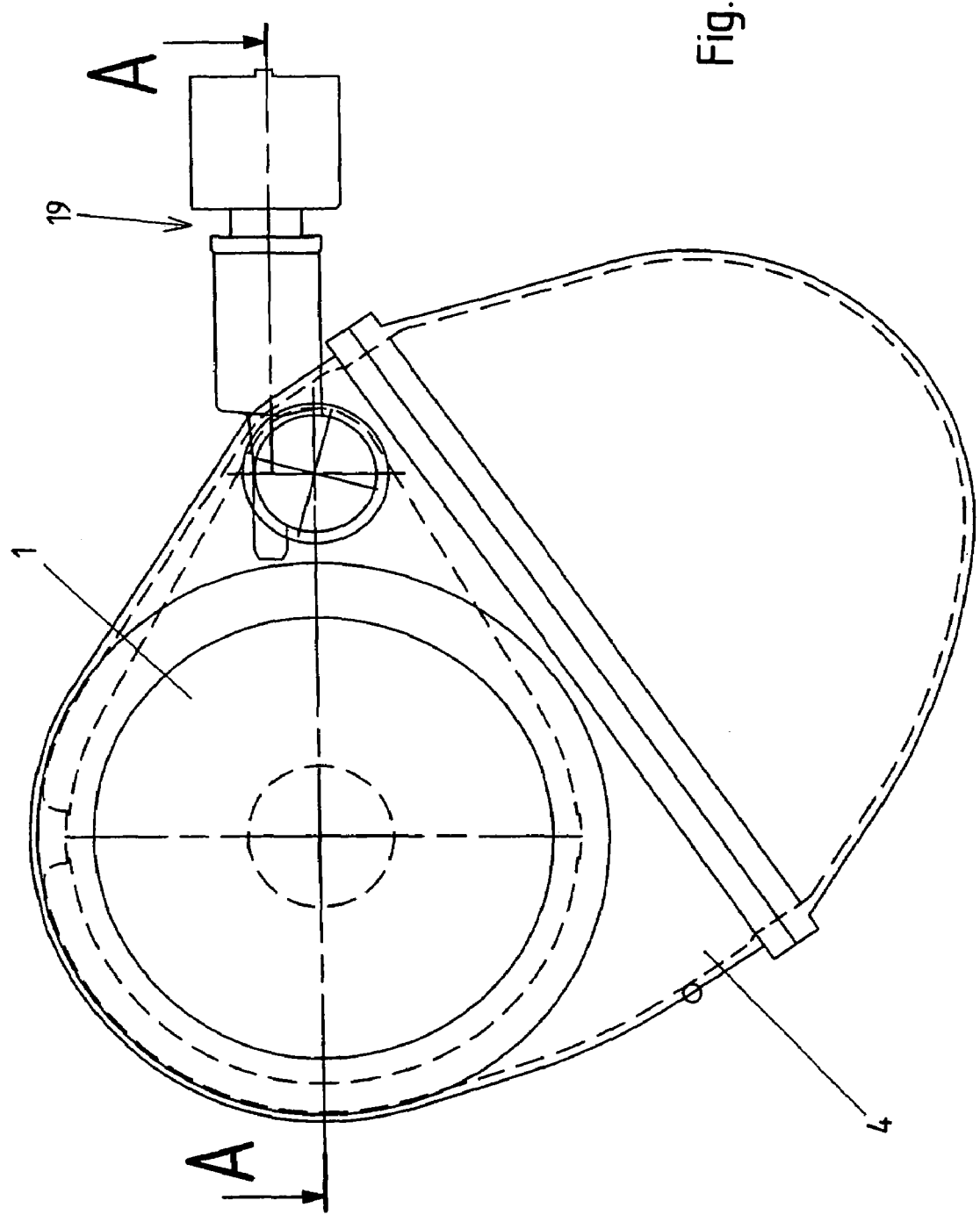
FIG. 1 shows a schematic view of a valve, according to the invention, in the completely closed state, wherein invisible lines are partly shown in dashes.
Figure 2:
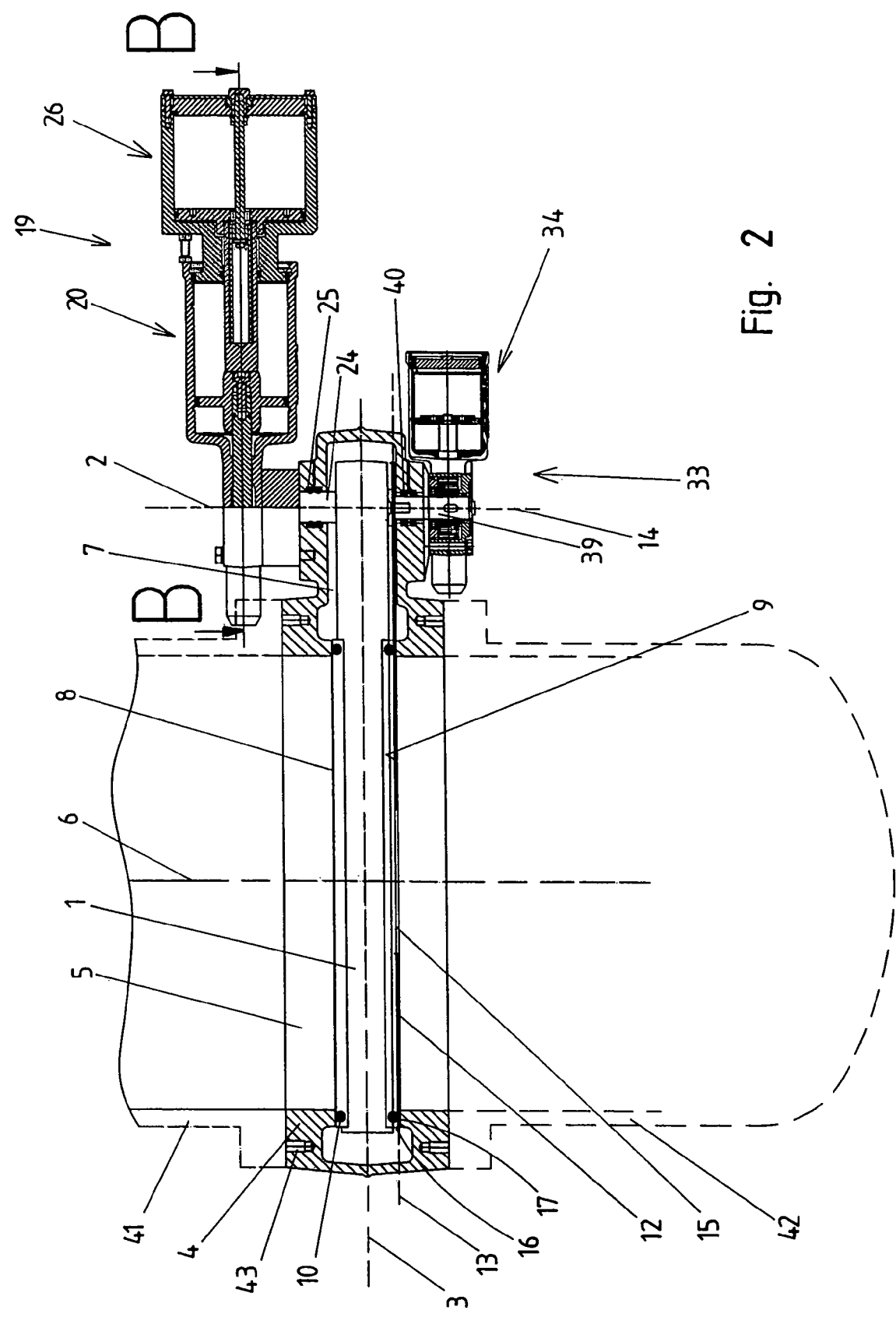
FIG. 2 shows a section along line A—A of FIG. 1.

In the completely closed state of the valve corresponding to FIGS. 1 and 2, in the present embodiment example, the valve plate 1 is in its closed position in which the valve opening is completely covered and the diaphragm plate 12 is also in its active position. The valve plate 1 is spread apart in the direction of the axis 6 of the valve opening 5 by a suitable spreading mechanism and contacts the valve seat 11 by a sealing ring 10 arranged at one of its side surfaces 8 and contacts the side surface of the diaphragm plate 12 facing the valve plate 1 by a supporting ring 17 arranged on its other side surface 9. The diaphragm plate 12 is accordingly pressed against a support surface 18 of the valve body 4. This support surface 18 is formed by a portion of the side wall of the recess 7 located on the side of the diaphragm plate 12, which portion surrounds the valve opening 5. The supporting ring 17 preferably comprises an elastic plastic, for example, Viton®, in order to prevent metal-to-metal contact between the valve plate 1 and the diaphragm plate 12. Further, in order to prevent metal-to-metal contact between the diaphragm plate 12 and the valve body 4, a supporting ring can be arranged at the diaphragm plate 12 or at the support surface 18. This supporting ring is also preferably made of an elastic plastic, e.g., Viton®.

The sealing ring 10 comprises a suitable material for this purpose, e.g., Viton®.

It is also conceivable and possible for the valve plate 1 to be in its closed position and the diaphragm plate 12 in its passive position in the completely closed and sealed state of the valve. The valve plate 1 is supported against the sealing surface arranged at the valve seat 11 on one side and against the support surface 18 of the valve body 4 on the other side. Constructions in which a sealed state of the valve can be achieved in the passive position as well as in the active position of the diaphragm plate 12 are also conceivable and possible.

Figure 7:
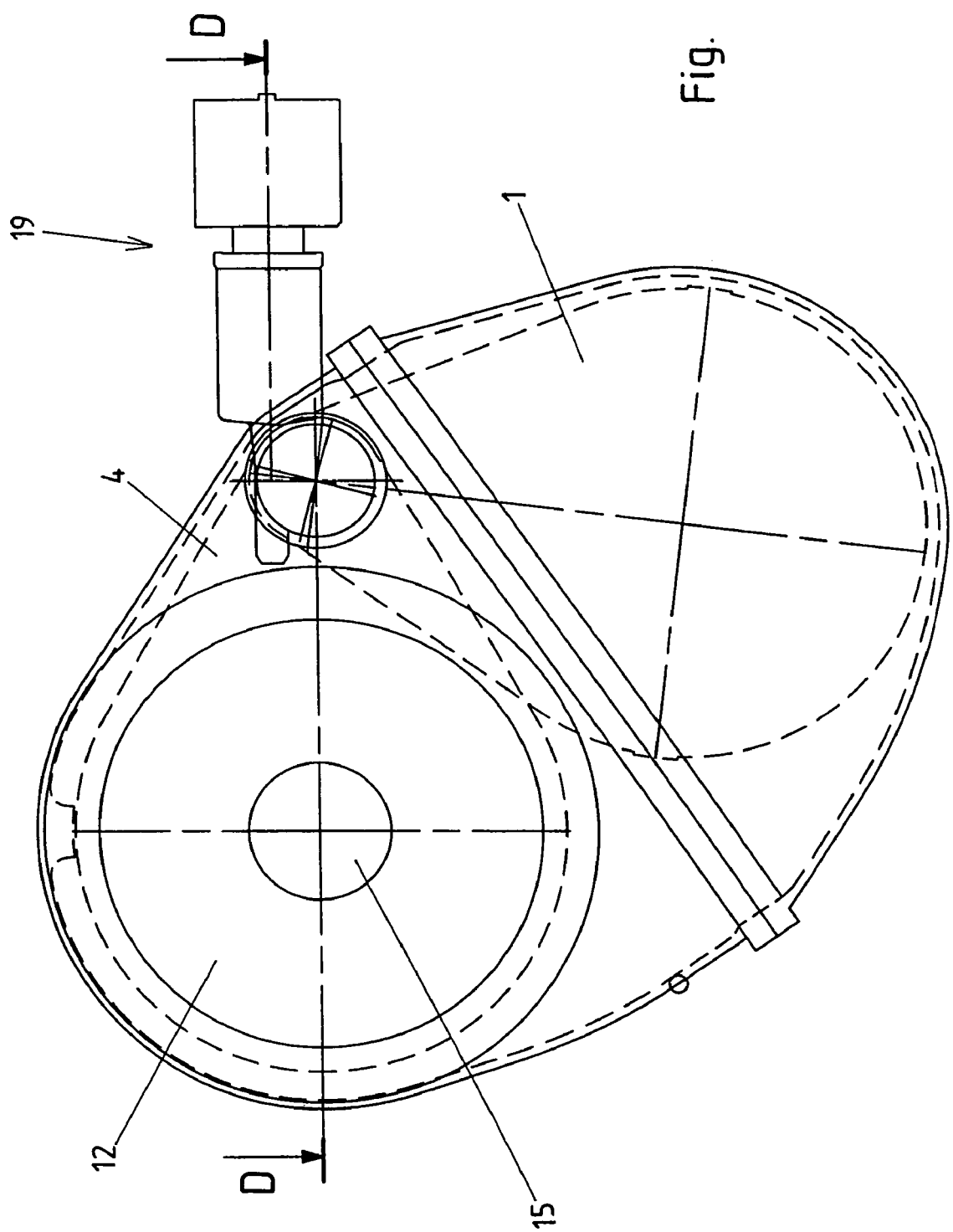
FIG. 7 shows a view corresponding to FIG. 1 in the partially closed state of the valve.
Figure 8:
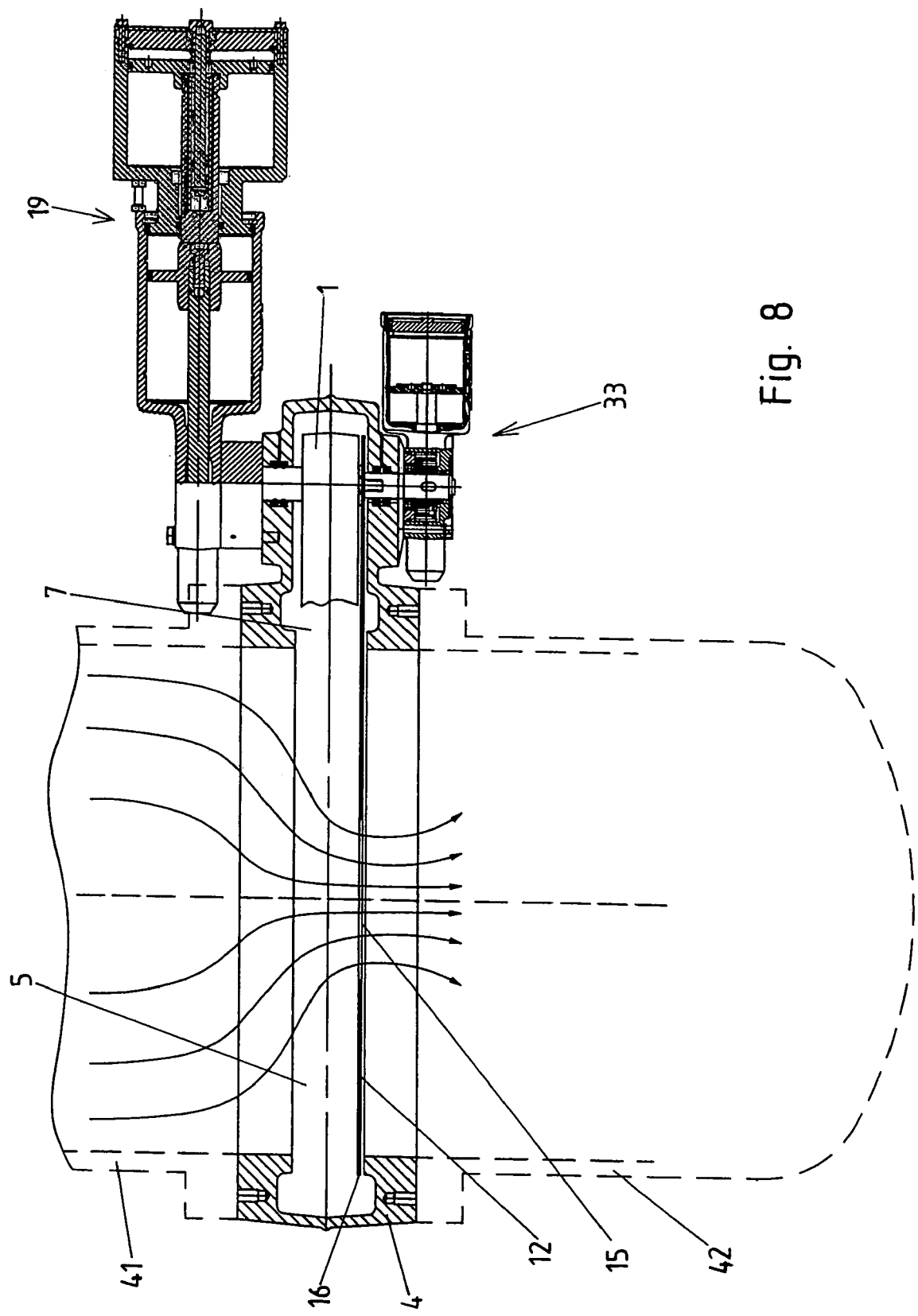
FIG. 8 shows a section along line D—D of FIG. 7.

In the partially closed state of the valve according to FIGS. 7 and 8, the valve plate 1 is in its open position and the diaphragm plate 12 is in its active position. The through-cross section of the valve is reduced compared to the completely open state of the valve and is determined substantially by the opening 15 in the diaphragm plate 12. The flow through the valve in this partially closed state passes centrically through the valve opening 5 and is symmetric to the axis 6 of the valve opening 5.

Figure 9:
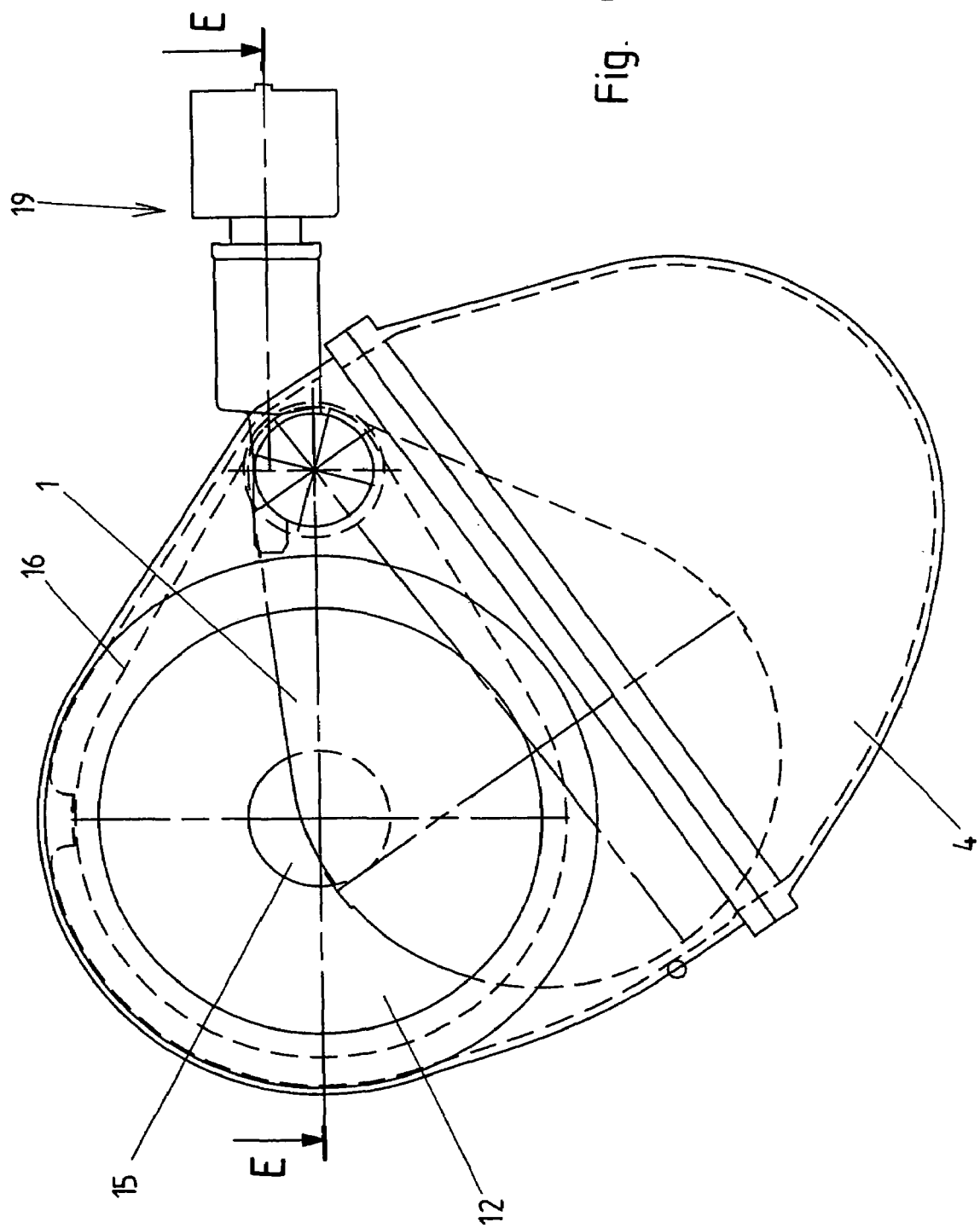
FIG. 9 shows a view corresponding to FIG. 1 in another partially closed state of the valve.
Figure 10:
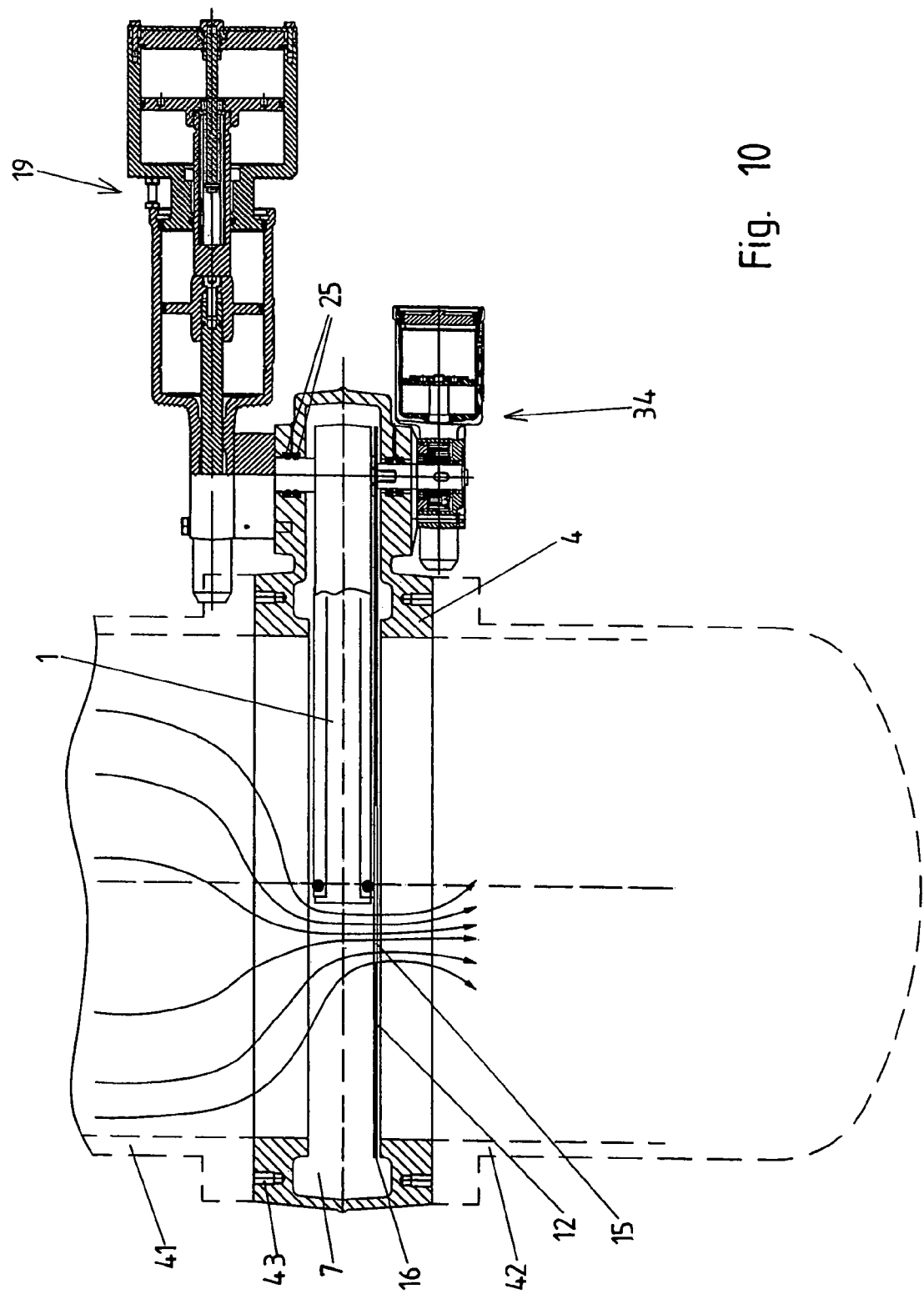
FIG. 10 shows a section along line E—E of FIG. 9.

The valve according to this embodiment example of the invention has another partially closed state which is shown in FIGS. 9 and 10. The diaphragm plate 12 is again in its active position. The valve plate 1 is in an intermediate position between its open position and closed position in which it partially covers the opening 15 of the diaphragm plate 12. The through-cross section through the valve is accordingly further reduced compared to the partially closed state shown in FIGS. 7 and 8. The remaining flow through the valve is no longer symmetric to the axis 6 of the valve opening, but still travels in the center area of the valve opening.

The drive 19 of the valve plate 1 comprises a first pneumatic piston-cylinder unit 20. The piston rod 21 of the piston 22 is constructed as a toothed rack and engages in a toothed engagement with a pinion 23 which is secured to a swiveling pin 24 that is swivelable around the swiveling axis 2. The swiveling pin 24 penetrates the valve body 4 and is sealed relative to the latter by means of at least one sealing ring 25 and projects into the recess 7 of the valve body 4 by its end located opposite from the pinion 23. The valve plate 1 is supported at this end of the swiveling pin 24 by the swiveling pin 24. The drive 19 has a second piston-cylinder unit 26 to enable an intermediate position of the valve plate 1 according to FIGS. 9 and 10. The piston rod 27 of the piston 28 projects into the cylinder space of the first piston-cylinder unit 20 so as to be sealed and contacts the piston 22 by its free end and contacts a projection 29 which faces away from this piston 22 in the direction opposite from the piston rod 21. The piston surface of piston 28 is larger than that of piston 22.

In the open position of the valve plate 1, the cylinder space 30 is acted upon by compressed air, while there is no pressure in the cylinder spaces 31 and 32. In the closed position of the valve plate 1, the cylinder space 31 is acted upon by compressed air and there is no pressure in the cylinder space 30. In the intermediate position of the valve plate 1, the cylinder spaces 30 and 32 are acted upon by compressed air and there is no pressure in the cylinder space 31.

The drive 19 of the valve plate 1 is accordingly constructed in a conventional manner as a three-position drive.

When no intermediate position of the valve plate 1 is required, the second piston-cylinder unit 26 can be omitted and the cylinder space 31 can be closed instead by a cover.

The drive 33 of the diaphragm plate 12 can be constructed analogous to drive 19 (without a second piston-cylinder unit 26). The piston rod 35 of the piston 36 of a piston-cylinder unit 34 is constructed as a toothed rack and engages in a toothed engagement with a pinion 37. The pinion 37 is secured by a clamping cone 38 to the swiveling pin 39 which is swivelable around the swiveling axis 14 and which is guided into the recess 7 of the valve body 4 by means of at least one sealing ring 40. The diaphragm plate 12 is fastened to the swiveling pin 39 inside the recess 7.

The compressed air lines of the drives 19, 33 are not shown in the drawings for the sake of simplicity.

The valve can be connected, for example, to a valve chamber 41 which is shown schematically in the drawing and, on the other side, to a pump 42 which is likewise shown schematically in the drawings. For this purpose, the valve body 4 has corresponding connection flanges which are not shown in detail in the drawings and can be constructed, for example, as screw flanges or clamp flanges (threaded bore holes 43 are indicated in the sectional views through the valve body 4, but not in the plan views).

For the sake of simplicity, parts not essential to the invention are not shown in the drawings. For example, the drives 19, 33 can have conventional position reporters.

The spreading of the valve plate 1 can be carried out in a conventional manner, for example, in that the drive 19 swivels the swiveling pins 24 farther in the same direction after the valve plate contacts a stop when swiveling into the closed position, so that spreading elements are put into operation. Devices for spreading apart valve plates are known in different embodiment forms, for example, from U.S. Pat. No. 4,052,036, U.S. Pat. No. 4,470,576 and U.S. Pat. No. 4,560,141, whose contents are adopted in the present text through reference. The mechanism for spreading the valve plate which can be constructed in a conventional manner is not shown in more detail in the drawing.

Figure 11:
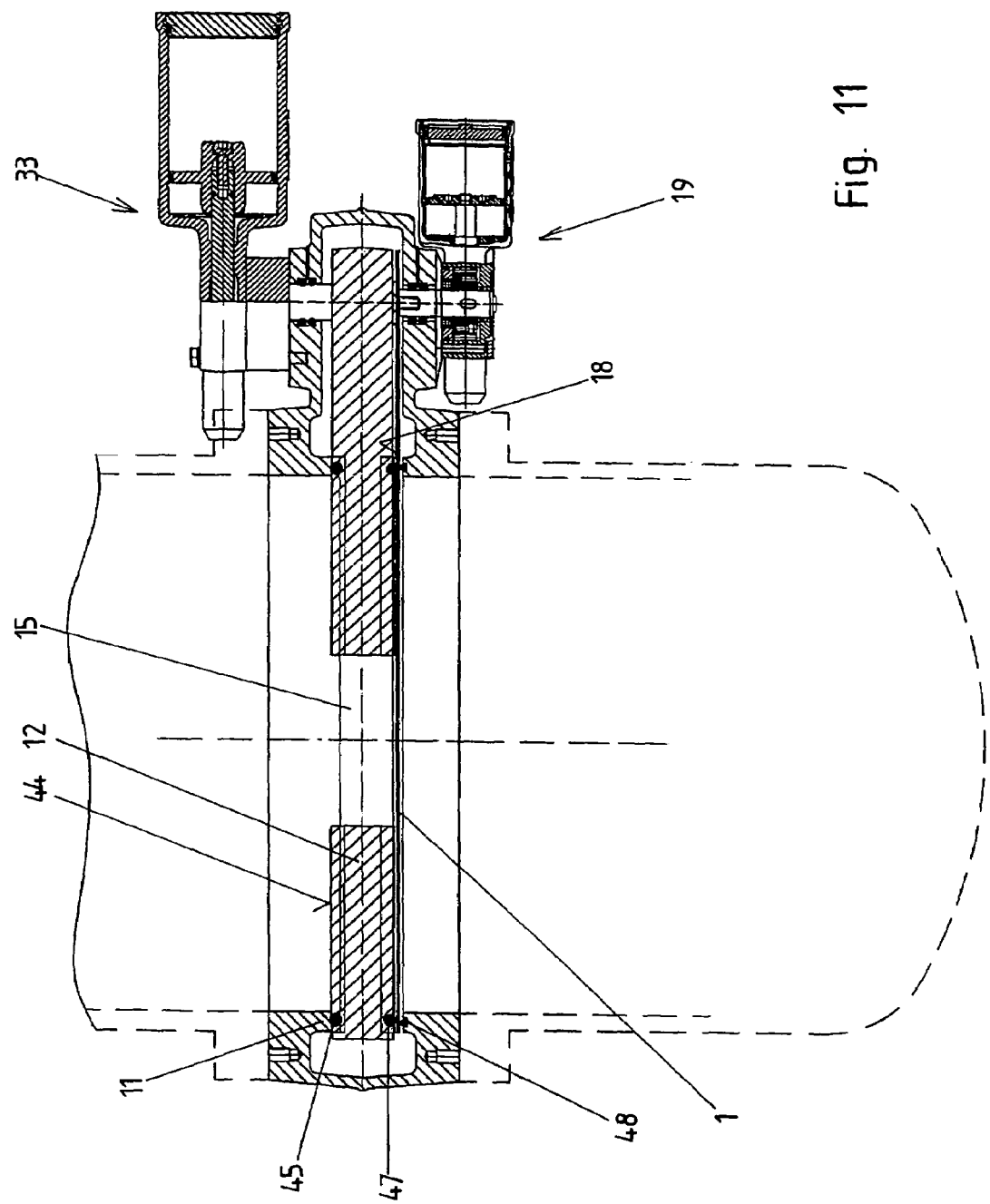
FIG. 11 shows a section of another embodiment example of the invention corresponding to FIG. 2 in the completely closed state of the valve.
Figure 12:
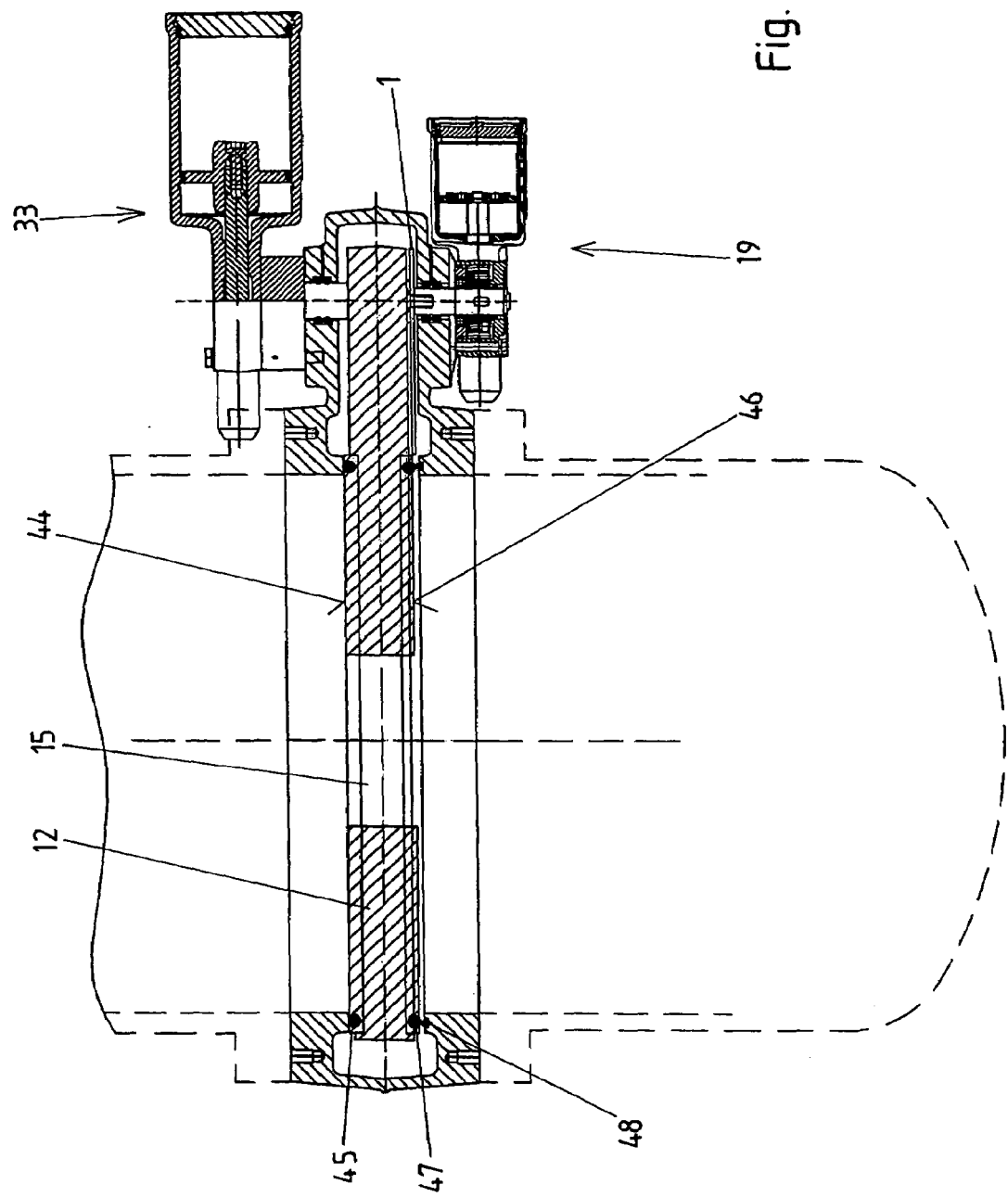
FIG. 12 shows the valve of FIG. 11 in the partially closed state.

In the embodiment examples shown in FIGS. 11 and 12, in contrast to the previously described embodiment example, the diaphragm plate 12 rather than the valve plate 1 is outfitted with a mechanism for spreading. FIG. 11 shows the completely closed, sealed state of the valve in which the diaphragm plate 12 is in its active position and the valve plate 1 is in its closed position. When the diaphragm plate 12 is spread apart in axial direction of the valve opening, the sealing ring 45 arranged at one side surface 44 of the diaphragm plate 12 contacts the sealing surface arranged at the valve seat 11 of the valve body. Further, the sealing ring 47 arranged at the other side surface 46 facing the valve plate 1 contacts the side surface of the valve plate 1 facing the diaphragm plate 12. The side surface of the valve plate 1 is constructed as a sealing surface in this area. In this way, the valve plate 1 is sealed relative to the valve body 4. The diaphragm plate 12 is supported against the support surface 18 of the valve body 4 with the intermediary of the valve plate 1. A supporting ring 48 is arranged at the support surface 18 in order to prevent metal-to-metal contact between the valve plate 1 and the valve body 4.

Instead of this, the supporting ring 48 could also be constructed as a sealing ring and the sealing rings 45, 47 could be constructed as supporting rings. In this case, the valve plate is pressed against the sealing ring 48 when the diaphragm plate 12 is spread apart. Sealing rings 45 and 47 can also be arranged at the diaphragm plate as well as at the support surface 18 or the side surface of the valve plate 1 located opposite from the support surface 18 for additional protection against leakage of the valve.

When an intermediate position of the valve plate 1 is desired in order to provide another partially closed state of the valve, the drive 19 of the valve plate 1 could be provided with an additional piston-cylinder unit such as is shown in FIG. 3.

Instead of an individual central opening, the diaphragm plate 12 in the embodiment examples shown above could also have a plurality of openings which are preferably formed symmetric to the axis 6 of the valve opening 5.

Another possible embodiment form of the diaphragm plate 12 is shown in FIGS. 13 to 18. The diaphragm plate 12+ has two partial plates 49, 50 which are connected to one another by a bolt 51, each of which has the same quantity of openings 53, 54 lying on am imaginary circular line at the same distance from one another on both partial plates 49, 50. By swiveling the two partial plates 49, 50 around the axis 52 of the bolt 51, the partial plates 49, 50 can be adjusted between a complete overlapping of the openings 53, 54 (FIG. 17) and a non-overlapping position of the openings 53, 54, so that the area of the resulting openings 15 of the diaphragm plate is adjustable. The through-cross section of the valve can be preadjusted in this way (symmetric to the axis of the valve opening in each instance) in its partially closed state (active position of the diaphragm plate and open position of the valve plate). Adjustment according to FIG. 13 gives the smallest through-cross section which results from the remaining residual gap.

Figure 21:
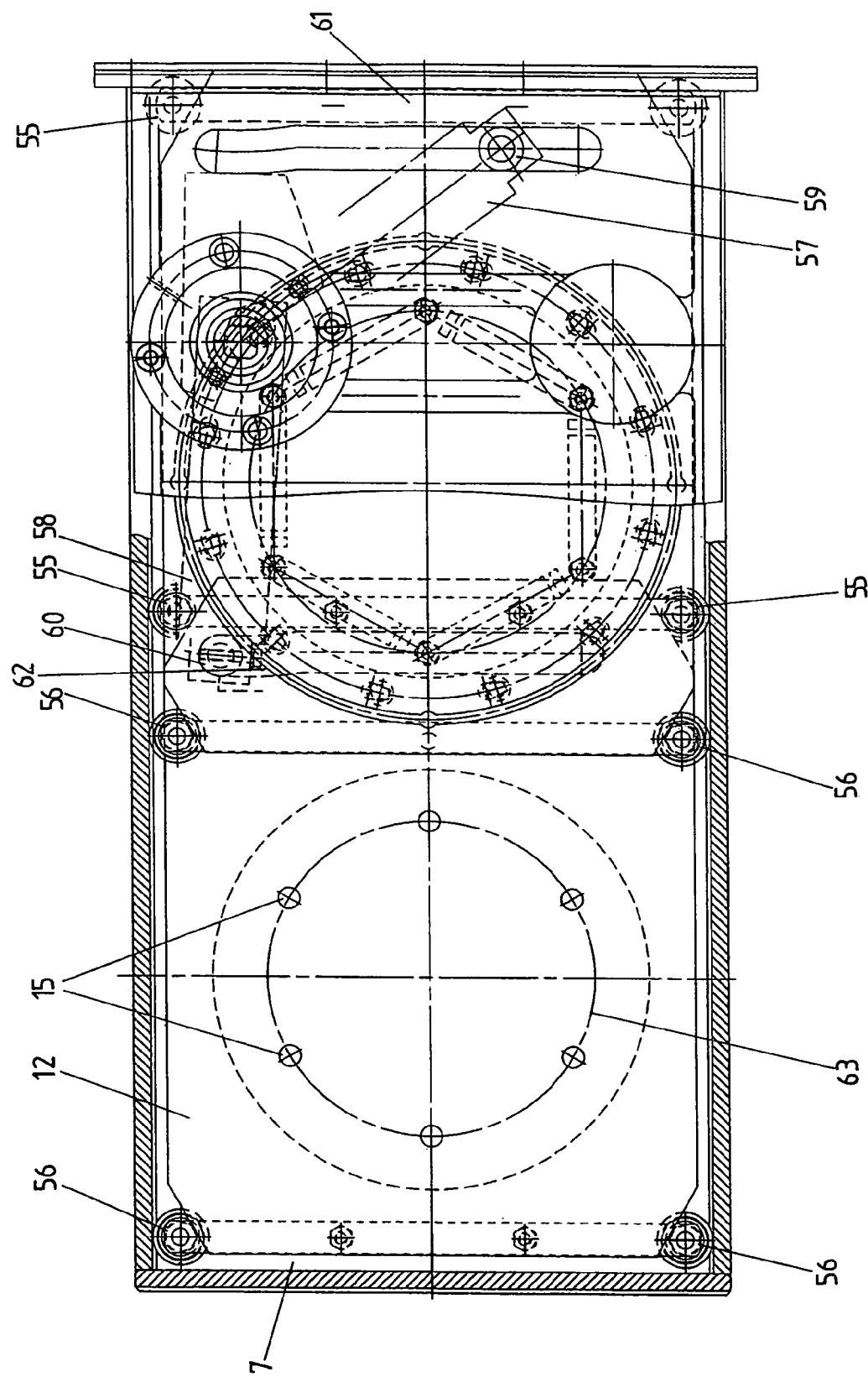
FIG. 21 shows a section corresponding to FIG. 19 in the partially closed state of the valve.

Another embodiment example of the invention is shown schematically in FIGS. 19 to 21. The valve plate 1 and the diaphragm plate 12 are mounted in the valve body 4 so as to be displaceable in a straight line. For this purpose, the valve plate 1 and the diaphragm plate 12 are constructed in the manner of a slide and are provided with running rollers 55, 56 and are displaceable along guide paths in the recess 7 of the valve body 4. Rotary drives, not shown in FIGS. 19 to 21, which can rotate the swivelably supported swiveling pins 24, 39 are used for displacing the valve plate 1 and the diaphragm plate 12. Lever arms 57, 58 are fastened to the swiveling pins 24, 39. Rollers 59, 60 which engage in recesses 61, 62 of the valve plate 1 and the diaphragm plate 12 are rotatably supported at the free ends of the lever arms 57, 58. The valve plate 1 and the diaphragm plate 12 are displaced by the rotation of the swiveling pins 24, 39 and the swiveling of the lever arms 57, 58 resulting from this. The valve plate 1 is again constructed in such a way that it can be spread apart in axial direction of the valve opening 5. The diaphragm plate 12 has a plurality of openings 15 arranged along an imaginary circular line 63; the circular line 63 is concentric to the axis 6 of the valve opening 5 in the active position of the diaphragm plate 12.

Various modifications of the embodiment examples of the invention shown herein are conceivable and possible without departing from the field of the invention. For example, the valve plate 1 could be moved by means of an L-movement from its open position to its closed position in which it is sealed relative to the valve body 4. An L-movement of this kind can be realized in the manner described in U.S. Pat. No. 6,431,518 B1, for example, which is adopted in the present text through reference. The sealing of the valve plate relative to the valve body could be carried out with the intermediary of the diaphragm plate or the diaphragm plate could be arranged on the side of the valve plate located opposite from the valve seat.

Further, the invention could also be carried out in connection with a valve in which a seal connection piece which is displaceably supported in the through-channel of the valve body is adjusted against the valve plate in the closed position of the valve plate to seal the valve. A seal connection piece of this kind is described, for example, in U.S. Pat. No. 5,577,707 which is adopted in the present text through reference. The sealing of the valve plate could be carried out again with the intermediary of the diaphragm plate or the diaphragm plate could be arranged on the side of the valve plate remote of the seal connection piece (in this case, the valve plate could be supported against the diaphragm plate in the sealed state of the valve).

The invention could also be used in connection with a valve in which the valve plate is displaceable in a straight line between the open position and its closed position in which it is sealed relative to the valve body. The sealing surface and associated seal are constructed in a three-dimensional manner in this case as is described, for example, in the British Patent GB 2 205 926 A which is adopted in the present text through reference.

The drives for the valve plate and diaphragm plate can also be constructed in a manner other than that described.

While the preceding description and the drawings depict the invention, it will be apparent to the person skilled in the art that various modifications can be carried out without departing from the true spirit and field of the invention.

REFERENCE NUMBERS 1. valve plate
2. swiveling axis
3. plane
4. valve body
5. valve opening
6. axis
7. recess
8. side surface
9. side surface 10. sealing ring
11. valve seat
12. diaphragn plate
13. plane
14. swiveling axis
15. opening
16. front edge
17. supporting ring
18. support surface
19. drive
20. first piston-cylinder unit
21. piston rod
22. piston
23. pinion
24. swiveling pins
25. sealing ring
26. second piston-cylinder unit
27. piston rod
28. piston
29. projection
30. cylinder space
31. cylinder space
32. cylinder space
33. drive
34. piston-cylinder unit
35. piston rod
36. piston
37. pinion
38. clamping cone
39. swiveling pin
40. sealing ring
41. valve chamber
42. pump
43. threaded bore hole
44. side surface
45. sealing ring
46. side surface
47. sealing ring
48. supporting ring
49. partial plate
50. partial plate
51. bolt
52. axis
53. opening
54. opening
55. running roller
56. running roller
57. lever arm
58. lever arm
59. roller
60. roller
61. recess
62. recess
63. circular line

What is claimed is:

1. A vacuum valve comprising:
a valve body with a valve opening;
a valve plate which is movable between an open position in which it lies next to the valve opening and releases the valve opening and a closed position in which the valve opening is covered; and
a diaphragm plate which is movable between a passive position, in which it lies next to the valve opening and releases the valve opening, and an active position in which it partially covers the valve opening;
wherein the vacuum valve has a completely open state in which the valve plate is in its open position and the diaphragm plate is in its passive position, a completely closed state in which the valve plate is in its closed position and the diaphragm plate is in its active position and the valve plate is sealed relative to the valve body, and a partially closed state in which the valve plate is in its open position and the diaphragm plate is in its active position, wherein the vacuum valve has a reduced cross section compared to the completely open state.

2. The vacuum valve according to claim 1, wherein the diaphragm plate has at least one opening.

3. The vacuum valve according to claim 1, wherein the diaphragm plate extends in its active position along its entire circumference beyond the cross-sectional area of the valve opening considered in the direction of the axis of the valve opening.

4. The vacuum valve according to claim 1, wherein the valve opening is formed by a through-channel through the valve body and a recess proceeds from the through-channel and extends to varying distances in all directions perpendicular to the axis of the valve opening.

5. The vacuum valve according to claim 4, wherein the diaphragm plate extends in its active position along its entire circumference into the recess of the through-channel.

6. The vacuum valve according to claim 4, wherein the diaphragm plate lies completely in the recess of the through-channel in its passive position.

7. The vacuum valve according to claim 4, wherein the valve plate extends along its entire circumference into the recess of the through-channel in its closed position.

8. The vacuum valve according to claim 4, wherein the valve plate lies completely in the recess of the through-channel in its open position.

9. The vacuum valve according to claim 1, wherein the valve plate can be moved between its open position and a position in its plane in which it completely covers the valve opening but is raised from the valve body.

10. The vacuum valve according to claim 9, wherein the valve plate is swivelable around a swiveling axis extending perpendicular to its plane between its open position and its position in which it completely covers the valve opening but is raised from the valve body.

11. The vacuum valve according to claim 9, wherein the valve plate is displaceable in a straight line between its open position and its position in which it completely covers the valve opening but is raised from the valve body.

12. The vacuum valve according to claim 1, wherein the diaphragm plate is movable in its plane between its passive position and its active position.

13. The vacuum valve according to claim 12, wherein the diaphragm plate is swivelable around a swiveling axis extending perpendicular to its plane between its passive position and its active position.

14. The vacuum valve according to claim 12, wherein the diaphragm plate is displaceable in a straight line between its passive position and its active position.

15. The vacuum valve according to claim 1, wherein the size of at least one opening of the diaphragm plate is adjustable.

16. The vacuum valve according to claim 1, wherein the valve plate is movable into an intermediate position between its open position and closed position in which it at least partially covers at least one opening of the diaphragm plate in its active position.

17. The vacuum valve according to claim 1, wherein the valve plate or the diaphragm plate comprises a spreading mechanism for spreading apart the valve plate or the diaphragm plate in the completely closed state of the vacuum valve for sealing the valve plate relative to the valve body.

* * * * *